US011327286B2

(12) United States Patent
Dailey et al.

(10) Patent No.: US 11,327,286 B2
(45) Date of Patent: *May 10, 2022

(54) MANAGING PLURAL SCANNING DEVICES IN A HIGH-THROUGHPUT LABORATORY ENVIRONMENT

(71) Applicant: Leica Biosystems Imaging, Inc., Vista, CA (US)

(72) Inventors: Timothy Dailey, San Diego, CA (US); Aaron Stearrett, Port Orchard, WA (US)

(73) Assignee: Leica Biosystems Imaging, Inc., Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/984,032

(22) Filed: Aug. 3, 2020

(65) Prior Publication Data

US 2020/0363617 A1 Nov. 19, 2020

Related U.S. Application Data

(63) Continuation of application No. 16/205,011, filed on Nov. 29, 2018, now Pat. No. 10,732,394.

(Continued)

(51) Int. Cl.
*G02B 21/00* (2006.01)
*G06F 9/4401* (2018.01)
*G01N 35/00* (2006.01)

(52) U.S. Cl.
CPC ....... *G02B 21/008* (2013.01); *G01N 35/0092* (2013.01); *G02B 21/0036* (2013.01);
(Continued)

(58) Field of Classification Search
CPC .................................................. G06F 9/4416
See application file for complete search history.

(56) References Cited

U.S. PATENT DOCUMENTS 6,266,809 B1 * 7/2001 Craig ........................ G06F 8/65
717/173
7,113,625 B2 9/2006 Watson et al.
(Continued)

FOREIGN PATENT DOCUMENTS

AU 2018375161 B2 4/2021
CN 111373239 A 7/2020
(Continued)

OTHER PUBLICATIONS

International Preliminary Report on Patentability (Chapter II of the Patent Cooperation Treaty) for related International Application No. PCTUS2018063163 dated Oct. 29, 2019, in 14 pages.
(Continued)

*Primary Examiner* — Douglas B Blair
(74) *Attorney, Agent, or Firm* — Knobbe, Martens, Olson & Bear, LLP

(57) ABSTRACT

Systems and methods for managing a plurality of scanning devices in a high-throughput laboratory environment. Each of the scanning devices is configured for a remote boot operation from an administrative server that is communicatively coupled with the plurality of scanning devices via a local network. The remote boot replaces the complete operational firmware of a scanning device. The scanning devices are each configured to periodically provide operational information to the administrative server for centralized storage. The centralized storage of operational information for each of the plurality of scanning devices, coupled with the ability of the administrative server to initiate a reboot of any scanning device and thereby update the complete operational firmware of the scanning device, allows for centralized administration of multiple scanning devices that facilitates configuration, support, image data storage, and/or communication with outside servers.

26 Claims, 2 Drawing Sheets

Related U.S. Application Data

(60) Provisional application No. 62/593,126, filed on Nov. 30, 2017.

(52) U.S. Cl.
CPC ..... G06F 9/4416 (2013.01); G01N 35/00871 (2013.01); G05B 2219/2652 (2013.01)

(56) References Cited

U.S. PATENT DOCUMENTS

| | | |
|---|---|---|
| 7,149,332 B2 | 12/2006 | Bacus et al. |
| 7,292,251 B1 | 11/2007 | Gu et al. |
| 7,542,596 B2 | 6/2009 | Bacus et al. |
| 7,593,787 B2 | 9/2009 | Feingold et al. |
| 7,860,727 B2 | 12/2010 | Showalter et al. |
| 7,936,913 B2 | 5/2011 | Nordell et al. |
| 8,203,575 B2 | 6/2012 | Molnr et al. |
| 8,463,741 B2 | 6/2013 | Ehlke et al. |
| 8,719,053 B2 | 5/2014 | Showalter et al. |
| 8,812,329 B2 | 8/2014 | Showalter et al. |
| 8,897,537 B2 | 11/2014 | Cosatto et al. |
| 9,182,324 B2 | 11/2015 | Feingold et al. |
| 9,230,153 B2 | 1/2016 | Casas |
| 9,268,619 B2 | 2/2016 | Rivkin |
| 10,732,394 B2* | 8/2020 | Dailey ............... G01N 35/0092 |
| 2003/0005276 A1 | 1/2003 | French et al. |
| 2006/0148063 A1* | 7/2006 | Fauzzi ............. G01N 35/00871 |
| | | 435/286.4 |
| 2007/0294385 A1* | 12/2007 | Kapadekar ................ G06F 8/65 |
| | | 709/223 |
| 2008/0134166 A1* | 6/2008 | Gallo ........................ G06F 8/65 |
| | | 717/173 |
| 2008/0168434 A1 | 7/2008 | Gee et al. |
| 2011/0060766 A1 | 3/2011 | Ehlke et al. |
| 2011/0066886 A1* | 3/2011 | Sugiura ................... G06F 21/10 |
| | | 714/16 |
| 2013/0166345 A1 | 6/2013 | Chirica et al. |
| 2014/0370836 A1 | 12/2014 | Gladstone |
| 2015/0109432 A1 | 4/2015 | Dixon et al. |
| 2015/0379328 A1 | 12/2015 | Casas |
| 2016/0004902 A1 | 1/2016 | Casas |
| 2016/0048013 A1 | 2/2016 | Tafas et al. |
| 2016/0180134 A1 | 6/2016 | Hughes |
| 2017/0220404 A1* | 8/2017 | Polar Seminario ........................ |
| | | G06F 11/0736 |

FOREIGN PATENT DOCUMENTS

| | | |
|---|---|---|
| JP | 2008-065555 A | 3/2008 |
| JP | 2009-053701 A | 3/2009 |
| JP | 2021-505926 A | 2/2021 |
| WO | WO 2019/108854 A1 | 6/2019 |

OTHER PUBLICATIONS

International Search Report and Written Opinion dated Feb. 8, 2019 for related International Application No. PCTUS2018063163, in 14 pages.
First Examination Report dated Oct. 21, 2020 for related Australian Patent Application No. 2018375161, in 4 pages.
Extended European Search Report for EP 18883538.3 dated Feb. 8, 2021 in 10 pages.

* cited by examiner

MANAGING PLURAL SCANNING DEVICES IN A HIGH-THROUGHPUT LABORATORY ENVIRONMENT

CROSS-REFERENCE TO RELATED APPLICATIONS

This application is a continuation of U.S. patent application Ser. No. 16/205,011, filed on Nov. 29, 2018, which claims priority to U.S. Provisional Patent App. No. 62/593,126, filed on Nov. 30, 2017, each of which is hereby incorporated herein by reference in its entirety.

BACKGROUND

Field of the Invention

The present invention generally relates to digital slide scanning devices (e.g., for pathology) and, more particularly, relates to managing plural digital slide scanning devices in a high-throughput laboratory environment.

Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology exploded and is currently regarded as one of the most promising avenues of diagnostic medicine in order to achieve even better, faster and cheaper diagnosis, prognosis, and prediction of important diseases such as cancer.

In a high-throughput laboratory environment or other environment with a plurality of digital slides scanning devices, administration of each individual scanning device is cumbersome, time consuming, redundant, and costly. In conventional high-throughput laboratory environments, each scanning device needs to be individually configured, supported, and updated. Therefore, what is needed is a system and method that overcomes these significant problems described above.

SUMMARY

Accordingly, to solve the problems described above, described herein are systems and methods for managing a plurality of scanning devices in a high-throughput laboratory environment. In an embodiment, each of the plurality of scanning devices is configured for a remote boot operation from an administrative server that is communicatively coupled with the plurality of scanning devices via a local network. The remote boot allows the administrative server to routinely update the operational firmware of each of the plurality of scanning devices. The scanning devices are also each configured to periodically provide operational information to the administrative server for storage in a data storage area of the administrative server. The centralized storage of operational information for each of the plurality of scanning devices, coupled with the ability of the administrative server to initiate a reboot of each of the plurality of scanning devices that results in an update of the complete operational firmware of the scanning device, allows for centralized administration of multiple scanning devices that facilitates configuration, support, image data storage, and/or communication with outside servers.

In an embodiment, a system is disclosed that comprises: a server device having a non-transitory data storage apparatus, the server device communicatively coupled with a plurality of digital slide scanning devices via a first network and communicatively coupled with a user device via a second network; wherein the server device is configured to, receive a current operational firmware from the user device via the second network, and store the current operational firmware in the non-transitory data storage apparatus, receive operational information from each of the plurality of digital slide scanning devices, and store the operational information in the non-transitory data storage apparatus, and, for each of the plurality of digital slide scanning devices, perform a network boot operation to the digital slide scanning device via the first network, wherein the network boot operation comprises sending an instruction to reboot the digital slide scanning device to the digital slide scanning device to trigger, at the digital slide scanning device, a download of the entire current operational firmware from the server device to the digital slide scanning device. The operational information may comprise digital slide image data and/or current configuration data for the respective digital slide scanning device. The first network may be a local area network, and the second network may comprise a wide area network (e.g., the Internet).

In an embodiment, the server device is further configured to: receive an instruction from the user device via the second network, wherein the instruction identifies a first digital slide scanning device from the plurality of digital slide scanning devices; and send an instruction, corresponding to the instruction received from the user device, to the first digital slide scanning device. Additionally or alternatively, the server device is further configured to: analyze the operational information stored in the non-transitory data storage apparatus; and schedule a maintenance appointment for at least one of the plurality of digital slide scanning devices based on the analysis.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain embodiments disclosed herein provide for managing a plurality of scanning devices in a high-throughput laboratory environment. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

1. Device Management

Figure 1:
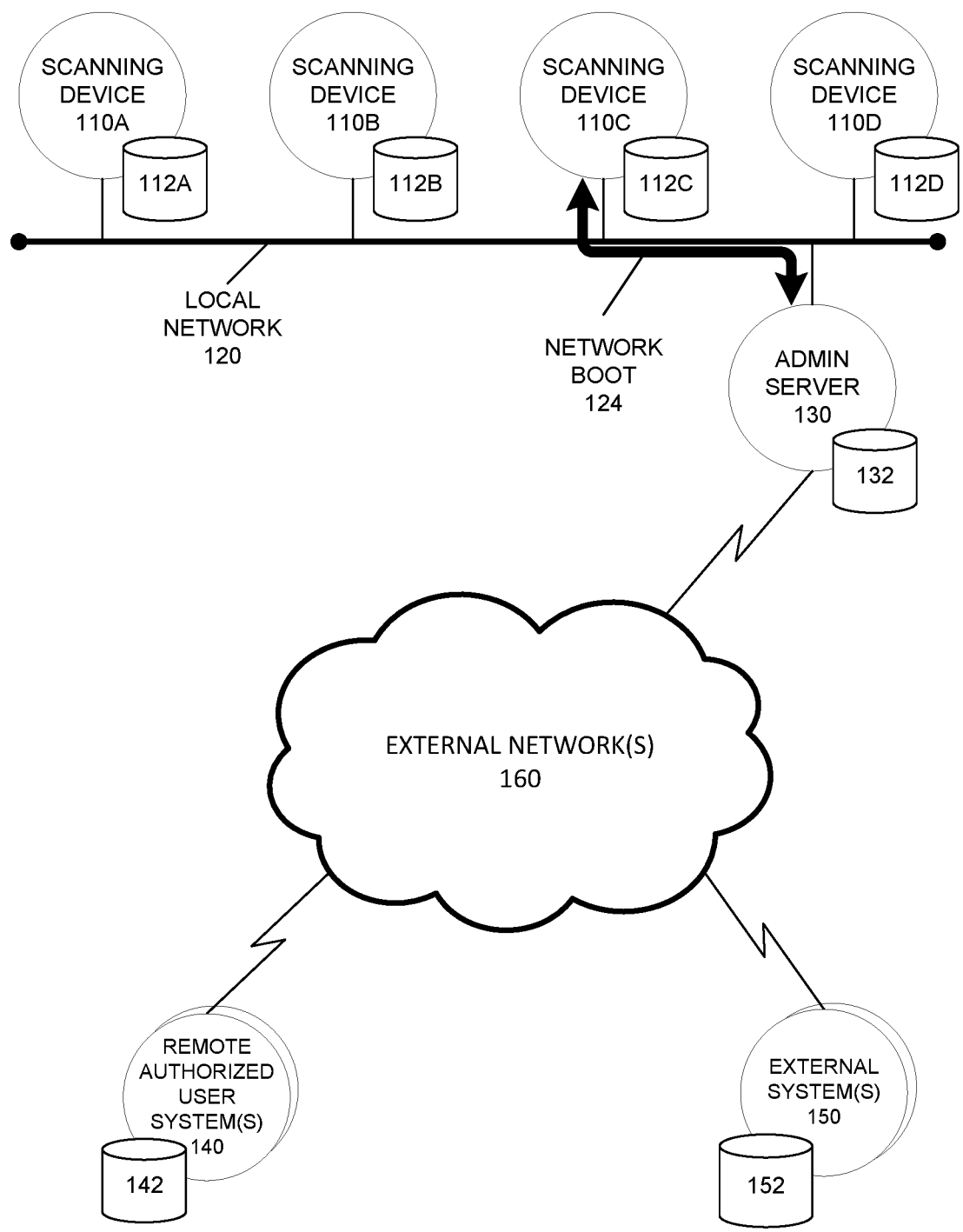
FIG. 1 is a network diagram illustrating an example system for managing a plurality of scanning devices in a high-throughput laboratory environment, according to an embodiment.

FIG. 1 is a network diagram illustrating an example system for managing a plurality of digital slide scanning devices in a high-throughput laboratory environment, according to an embodiment. In the illustrated embodiment, a plurality of digital slide scanning devices 110, having local data storage areas 112, are communicatively coupled with an administrative server 130, having local data storage area 132, via a first network 120. In an embodiment, the first network is a local area network, which is a single network segment that allows a network boot operation 124 to be performed by each scanning device 110 in combination with the administrative server 130.

In an embodiment, a network boot operation 124 includes the scanning device 110 broadcasting a request for operational instructions on the local network 120, and the administrative server 130 responding with instructions for the scanning device 110 to follow. In an embodiment, the instructions provided by the administrative server 130 to the scanning device 110 in response to the broadcast request comprise the entire operational firmware of the requesting digital slide scanning device 110. Subsequent to receiving the response from the administrative server 130, with the entire operational firmware, the requesting scanning device 110 begins operation using the newly received operational firmware.

For example, in an embodiment, when a scanner device 110 boots, it requests the device firmware from the administrative server 130 over the local network 120, and the administrative server 130 provides the device firmware to the scanner 110 over the local network 120 for execution. The complete operational software for the scanner 110 is included in the device firmware. This allows the administrative server 130 to control which version of device firmware is provided to a given scanner device 110. Additionally, the firmware of the scanner device 110 can be cryptographically signed, such that only authorized device firmware is allowed to be executed on the scanning device 110. The administrative server 130 can also remotely reboot each scanner device 110 to force an update of the firmware on that scanner device 110.

In an embodiment, the administrative server 130 is also communicatively coupled with one or more remote authorized user systems 140, having local data storage areas 142, via a second network 160. The second network 160 may be a wide area network and may include the Internet. In operation, a user of a remote authorized user system 140 may remotely log in to the administrative server 130 and review operational data and other information about the plurality of scanning devices 110 that is stored in the data storage area 132 of the administrative server 130. Additionally, while logged into the administrative server 130, the user of a remote authorized user system 140 may upload new information to the administrative server 130, such as an updated version of the operational firmware for a scanning device 110. While logged into the administrative server 130, the user of a remote authorized user system 140 may also initiate a reboot of one or more of the plurality of scanning devices 110, in order to cause the updated version of the operational firmware to be deployed to each of the rebooted scanning devices 100. While logged into the administrative server 130, the user of a remote authorized user system 140 may also initiate diagnostic procedures on one or more of the plurality of scanning devices 110, in order to generate additional information about the respective one or more of the plurality of scanning devices 110 for review by the remote authorized user.

In an embodiment, the administrative server 130 facilitates remote troubleshooting of the plurality of scanning devices 110. Remote troubleshooting may include viewing and/or processing log files, scanner operational status, device cautions, and/or warnings. All configuration information for scanning devices 110 may be periodically and automatically provided to the administrative server 130 by each scanning device 110. This configuration information may be stored in the non-transitory data storage area 132 of the administrative server 130. Centralized storage at the administrative server 130 of operational information about each of the plurality of scanning devices 110 facilitates efficient maintenance of the plurality of scanning devices 110 and allows a single scanning device 110 to be serviced and/or repaired without a need to obtain information from the single scanning device 110 itself. Centralized storage at the administrative server 130 of operational information about each of the plurality of scanning devices 110 also simplifies the support of multiple scanning devices 110 residing at a single location. For example, the configuration of scanning devices 110 only needs to be performed once at the administrative server 130, prior to propagation to each of the plurality of scanning devices 110, instead of being separately performed for each scanning device 110.

In an embodiment, while logged into the administrative server 130, the user of a remote authorized user system 140 may review log file information and determine that a particular hardware component of a particular scanning device 110 has an intermittent failure. The user of the remote authorized user system 140 may then initiate a hardware diagnostic text that is executed on the particular scanning device 110 to assist the user of the remote authorized user system 140 in determining whether or not the particular hardware component is operating within desire parameters. If the particular hardware component is not operating within desire parameters, the remote authorized user system 140 may order a replacement for the particular hardware component to be delivered and installed.

Moreover, when a particular hardware component is being replaced, for example by field personnel at the location of a particular scanning device 110, while logged into the administrative server 130, a user of the remote authorized user system 140 or the field personnel may initiate setup procedures that are executed on the particular scanning device 110 to assist in the configuration of the replacement component. The user of the remote authorized user system 140 or the field personnel may also, while logged into the administrative server 130, initial test procedures that are executed on the particular scanning device 110 to validate proper replacement of the hardware component and verify that the replaced hardware component is operating within desired parameters.

Accordingly, in a scanning environment with a plurality of scanning devices 110, the administrative server 130 facilitates centralized administration of multiple scanner devices 110, to provide configuration, installation support, image data storage, and communication with external systems 150. The administrative server 130 is also communicatively coupled with one or more external systems 150, having local data storage areas 152, via the second network 160. In operation, an external system 150 may be employed to remotely store digital pathology slide images and/or other information generated by one or more of the plurality of scanner devices 110.

2. Example Embodiments

In an embodiment, a system for managing a plurality of digital slide scanning devices in a high-throughput laboratory environment includes a server device having a non-transitory data storage apparatus, the server device communicatively coupled with a first network and a second network, wherein the first network is a local network segment. The system also includes a plurality of digital slide scanning devices communicatively coupled with the server device via the first network. Each of the plurality of digital slide scanning devices is configured to perform a network boot operation from the server device via the first network. The network boot operation replaces the entire operational firmware of the booting digital slide scanning device. The system may also include a remote authorized user device communicatively coupled with the server device via the second network.

In an embodiment, the server device is configured to receive operational information from each of the plurality of digital slide scanning devices and store the operational information in the non-transitory data storage apparatus. The server device is also configured to receive current operational firmware from the remote authorized user device and store the current operational firmware in the non-transitory data storage apparatus. The server device is also configured to update the operational firmware of each of the plurality of digital slide scanning devices to the current operational firmware.

In an embodiment, the server device is configured to initiate a reboot of each of the plurality of digital slide scanning devices to update the operational firmware of each of the plurality of digital slide scanning devices to the current operational firmware.

In an embodiment, the operational information comprises digital slide image data. In an embodiment, the operational information comprises current configuration data for the respective digital slide scanning device.

In an embodiment, the server device is configured to receive an instruction from the remote authorized user device that identifies a first digital slide scanning device. Subsequent to receiving the instruction, the server device is configured to send a corresponding instruction to the first digital slide scanning device.

In an embodiment, the server device is configured to analyze operational information stored in the non-transitory data storage apparatus and schedule a maintenance appointment for at least one of the plurality of digital slide scanning devices based on said analysis.

3. Example Digital Slide Scanning Apparatus

Figure 2A:
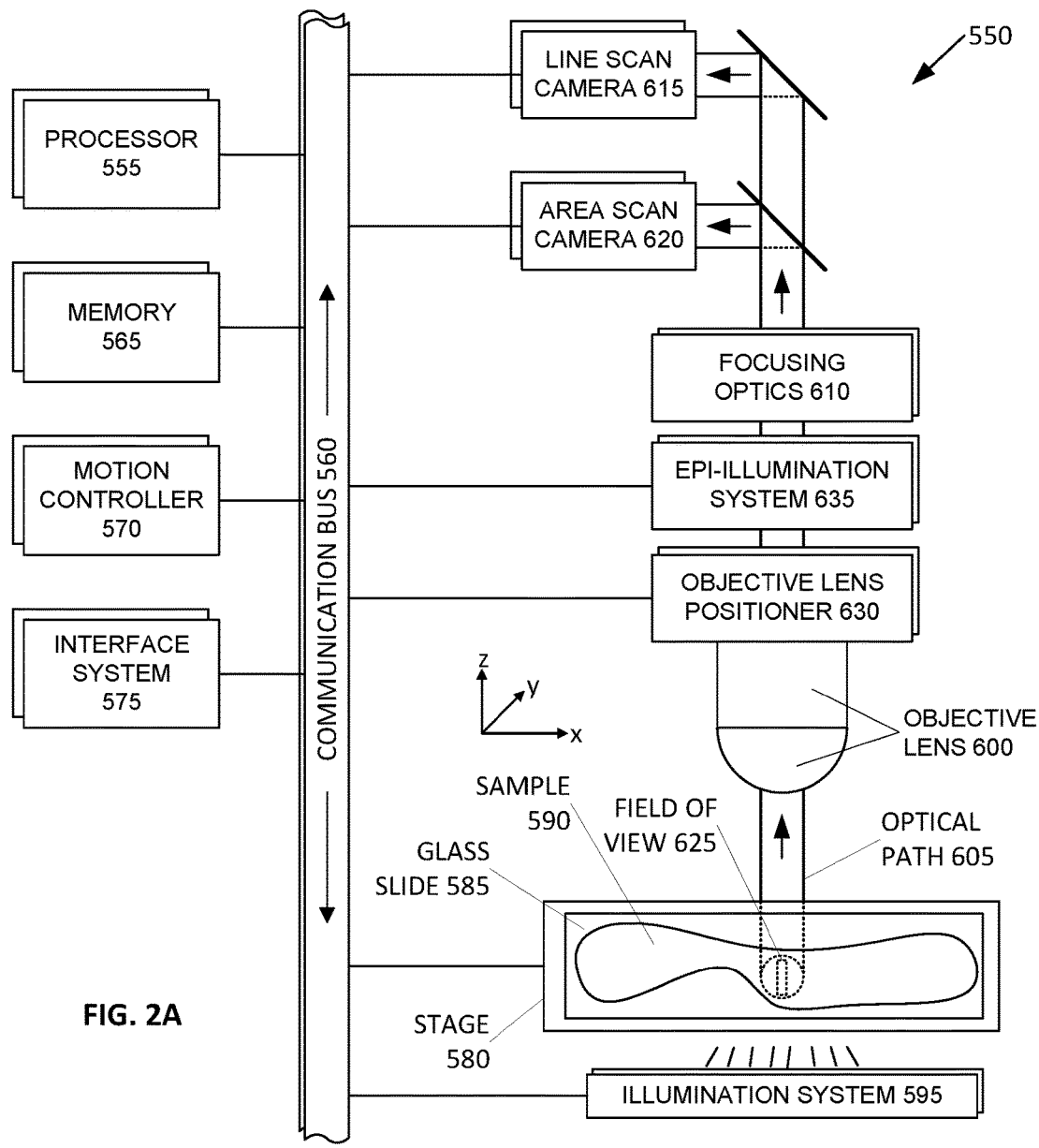
FIG. 2A is a block diagram illustrating an example processor-enabled device that may be used in connection with various embodiments described herein.

FIG. 2A is a block diagram illustrating an example processor-enabled device 550 that may be used in connection with various embodiments described herein. Alternative forms of the device 550 may also be used as will be understood by the skilled artisan. In the illustrated embodiment, the device 550 is presented as a digital imaging device (also referred to herein as a scanner system, a scanning system, a digital slide scanning apparatus, a scanning apparatus, etc.) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence-based scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity, these elements will be described in the singular except when needed to be described in the plural to convey the appropriate information.

The one or more processors 555 may include, for example, a central processing unit (CPU) and a separate graphics processing unit (GPU) capable of processing instructions. In an embodiment, the one or more processors 555 may include a multi-core processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal-processing algorithms (e.g., digital-signal processor), a slave processor subordinate to the main processor (e.g., back-end processor), and/or an additional processor for controlling the line scan camera 615, the stage 580, the objective lens 225, and/or a display (not shown). Such additional processors may be separate discrete processors or may be integrated with the processor 555.

The memory 565 provides storage of data and instructions for programs that can be executed by the processor 555. The memory 565 may include one or more volatile and persistent computer-readable storage media that store the data and instructions, including, without limitation, a random access memory, a read only memory, a hard disk drive, removable storage drive, and/or the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575, via the one or more communication busses 560, may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate X-Y-Z movement of the stage 580 and/or the objective lens 600 (e.g., via the objective lens positioner 630). In an embodiment, the stage 580 is capable of movement along X and Y axes, while the objective lens 600 is capable of movement along a Z axis. The motion control system 570 is also configured to control movement of any other moving part in the scanner system 550. For example, in a fluorescence-based scanner embodiment, the motion control system 570 is configured to coordinate movement of optical filters and the like in the epi-illumination system 635.

In an embodiment, the interface system 575 allows the scanner system 550 to interface with other systems and human operators. For example, the interface system 575 may include a user interface to provide information directly to an operator and/or to allow direct input from an operator. The interface system 575 may also be configured to facilitate communication and data transfer between the scanning system 550 and one or more external devices that are directly connected (e.g., a printer, removable storage medium, etc.) or external devices such as an image server system, an operator station, a user station, an administrative server system, and/or the like that are connected to the scanner system 550 via a network (not shown).

The illumination system 595 is configured to illuminate a portion of the sample 590. The illumination system may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In an embodiment, the illumination system 595 illuminates the sample 590 in transmission mode such that the line scan camera 615 and/or area scan camera 620 sense optical energy that is transmitted through the sample 590. Alternatively, or in combination, the illumination system 595 may be configured to illuminate the sample 590 in reflection mode such that the line scan camera 615 and/or area scan camera 620 sense optical energy that is reflected from the sample 590. More generally, the illumination system 595 may be configured to be suitable for interrogation of the microscopic sample 590 in any known mode of optical microscopy.

In an embodiment, the scanner system 550 includes an epi-illumination system 635 to optimize the scanner system 550 for fluorescence-based scanning. Fluorescence-based scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, a fluorescence-based embodiment of the scanner system 550 uses a line scan camera 615 that includes multiple linear sensor arrays (e.g., a time delay integration ("TDI") line scan camera) and increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence-based scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence-based scanner embodiment, a line scan camera 615 used in the fluorescence-based scanning system 550 is a monochrome 10-bit 64-linear-array TDI line scan camera. It should be noted that a variety of bit depths for the line scan camera 615 can be employed for use with a fluorescence-based scanner embodiment of the scanning system 550.

The movable stage 580 is configured for precise X-Y movement under control of the processor 555 or the motion controller 570. The movable stage may also be configured for movement along a Z axis under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity and then maintain the substantially constant velocity during image data capture by the line scan camera 615. The scanner system 550 may employ a high-precision and tightly coordinated X-Y grid to aid in the location of the sample 590 on the movable stage 580. In an embodiment, the movable stage 580 is a linear-motor-based X-Y stage with high precision encoders employed on both the X and the Y axes. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA, RNA, or protein that is deposited on any type of slide or other substrate, including any and all samples commonly known as a microarrays. The sample 590 may be a microtiter plate (e.g., a 96-well plate). Other examples of the sample 590 include integrated circuit boards, electrophoresis records, petri dishes, film, semiconductor materials, forensic materials, and machined parts.

Objective lens 600 is mounted on the objective positioner 630 which, in an embodiment, employs a very precise linear motor to move the objective lens 600 along the optical axis defined by the objective lens 600. For example, the linear motor of the objective lens positioner 630 may include a 50-nanometer encoder. The relative positions of the stage 580 and the objective lens 600 in X, Y, and Z axes are coordinated and controlled in a closed-loop manner using motion controller 570 under the control of the processor 555 that employs memory 565 for storing information and instructions, including the computer-executable programmed steps for overall scanning system 550 operation.

In an embodiment, the objective lens 600 is a plan apochromatic ("APO") infinity corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40x, 0.75NA or 20x, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal, captured by the objective lens 600, onto the light-responsive elements of the line scan camera 615 and/or the area scan camera 620 and may include optical components such as filters, magnification changer lenses, and/or the like. The objective lens 600, combined with focusing optics 610, provides the total magnification for the scanning system 550. In an embodiment, the focusing optics 610 may contain a tube lens and an optional 2x magnification changer. Advantageously, the 2x magnification changer allows a native 20x objective lens 600 to scan the sample 590 at 40x magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a three linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. The scanner system 550 also supports linear arrays that are manufactured in a variety of formats including some with 512 pixels, some with 1,024 pixels, and others having as many as 4,096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615, so that the stage 580 can be in motion with respect to the line scan camera 615 during the digital image capture of the sample 590.

The image data generated by the line scan camera 615 is stored in a portion of the memory 565 and processed by the processor 555 to generate a contiguous digital image of at least a portion of the sample 590. The contiguous digital image can be further processed by the processor 555, and the revised contiguous digital image can also be stored in the memory 565.

In an embodiment with two or more line scan cameras 615, at least one of the line scan cameras 615 can be configured to function as the focusing sensor that operates in combination with at least one of the line scan cameras 615 that is configured to function as the imaging sensor. The focusing sensor can be logically positioned on the same optical axis as the imaging sensor or the focusing sensor may be logically positioned before or after the imaging sensor with respect to the scanning direction of the scanner system 550. In an embodiment with at least one line scan camera 615 functioning as a focusing sensor, the image data generated by the focusing sensor is stored in a portion of the memory 565 and processed by the one or more processors 555 to generate focus information to allow the scanner system 550 to adjust the relative distance between the sample 590 and the objective lens 600 to maintain focus on the sample during scanning. Additionally, in an embodiment, the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitization of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data (e.g., an adjacent stripe). Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image stripe. A plurality of adjacent image stripes are similarly combined to form a contiguous digital image of a portion of the sample 590 or the entire sample 590. The scanning of the sample 590 may include acquiring vertical image stripes or horizontal image stripes. The scanning of the sample 590 may be either top-to-bottom, bottom-to-top, or both (bi-directional) and may start at any point on the sample 590. Alternatively, the scanning of the sample 590 may be either left-to-right, right-to-left, or both (bi-directional) and may start at any point on the sample 590. Additionally, it is not necessary that image stripes be acquired in an adjacent or contiguous manner. Furthermore, the resulting image of the sample 590 may be an image of the entire sample 590 or only a portion of the sample 590.

In an embodiment, computer-executable instructions (e.g., programmed modules and software) are stored in the memory 565 and, when executed, enable the scanning system 550 to perform the various functions described herein. In this description, the term "computer-readable storage medium" is used to refer to any media used to store and provide computer-executable instructions to the scanning system 550 for execution by the processor 555. Examples of these media include memory 565 and any removable or external storage medium (not shown) communicatively coupled with the scanning system 550 either directly or indirectly, for example via a network (not shown).

Figure 2B:
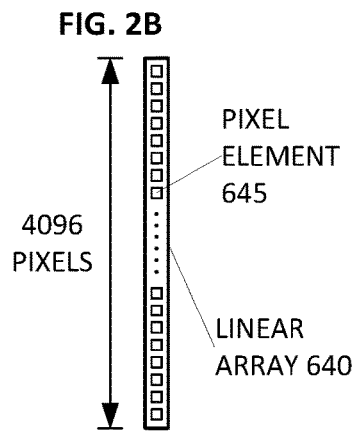
FIG. 2B is a block diagram illustrating an example line-scan camera having a single linear array, according to an embodiment.

FIG. 2B illustrates a line scan camera 615 having a single linear array 640, which may be implemented as a charge coupled device (CCD) array. The single linear array 640 comprises a plurality of individual pixels 645. In the illustrated embodiment, the single linear array 640 has 4,096 pixels. In an alternative embodiment, linear array 640 may have more or fewer pixels. For example, common formats of linear arrays include 512, 1,024, and 4,096 pixels. The pixels 645 are arranged in a linear fashion to define a field of view 625 for the linear array 640. The size of the field of view varies in accordance with the magnification of the scanner system 550.

Figure 2C:
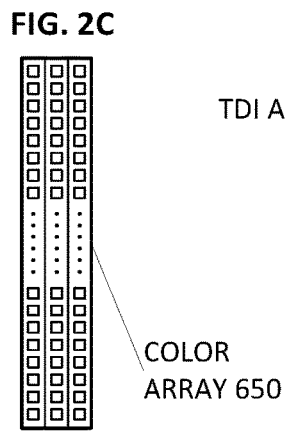
FIG. 2C is a block diagram illustrating an example line-scan camera having three linear arrays, according to an embodiment.

FIG. 2C illustrates a line scan camera having three linear arrays, each of which may be implemented as a CCD array. The three linear arrays combine to form a color array 650. In an embodiment, each individual linear array in the color array 650 detects a different color intensity (e.g., red, green, or blue). The color image data from each individual linear array in the color array 650 is combined to form a single field of view 625 of color image data.

Figure 2D:
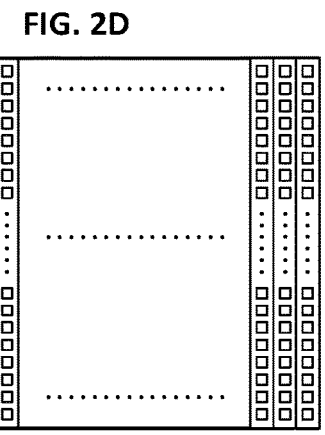
FIG. 2D is a block diagram illustrating an example line-scan camera having a plurality of linear arrays, according to an embodiment.

FIG. 2D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays. For example, common formats of TDI line scan cameras include 24, 32, 48, 64, 96, 120, and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method of updating firmware using a server device having a non-transitory data storage apparatus and communicatively coupled with a plurality of digital slide scanning devices via a first network and communicatively coupled with a user device via a second network, the method comprising:
receiving a current operational firmware from a user device via a second network and storing the current operational firmware in the non-transitory data storage apparatus;
receiving operational information from each of the plurality of digital slide scanning devices and storing the operational information in the non-transitory data storage apparatus; and
for each of the plurality of digital slide scanning devices, performing a network boot operation on the digital slide scanning device via the first network, wherein the network boot operation comprises sending an instruction to reboot the digital slide scanning device to the digital slide scanning device to trigger, at the digital slide scanning device, a download of the current operational firmware from the server device to the digital slide scanning device.

2. The method of claim 1, wherein the operational information comprises digital slide image data.

3. The method of claim 1, wherein the operational information comprises current configuration data for the respective digital slide scanning device.

4. The method of claim 1, further comprising:
receiving an instruction from the user device via the second network, wherein the instruction identifies a first digital slide scanning device from the plurality of digital slide scanning devices; and
sending an instruction, corresponding to the instruction received from the user device, to the first digital slide scanning device.

5. The method of claim 1, further comprising:
analyzing the operational information stored in the non-transitory data storage apparatus;
and scheduling a maintenance appointment for at least one of the plurality of digital slide scanning devices based on the analysis.

6. The method of claim 1, wherein the first network is a local area network, and wherein the second network comprises a wide area network.

7. The method of claim 6, wherein the second network comprises the Internet.

8. The method of claim 1, wherein the operational information comprises synchronization information for a stage and line scan camera.

9. The method of claim 1, wherein the operational information comprises at least one contiguous digital image.

10. The method of claim 1, wherein the operational information comprises information for at least one line scan camera.

11. The method of claim 1, wherein the operational information comprises information related to an imaging sensor.

12. The method of claim 1, wherein the operational information comprises information related to a focusing sensor.

13. The method of claim 1, wherein the operational information comprises focus information.

14. A system comprising:
a server device having a non-transitory data storage apparatus, the server device communicatively coupled with a plurality of digital slide scanning devices and a user device via a network;
each of the plurality of digital slide scanning devices having a local data storage area;
the server device configured to:
receive a current operational firmware from the user device via the network, and store the current operational firmware in the non-transitory data storage apparatus;

receive operational information from each of the plurality of digital slide scanning devices, and store the operational information in the non-transitory data storage apparatus; and, for each of the plurality of digital slide scanning devices, perform a network boot operation by sending an instruction via the network to the digital slide scanning device to reboot and download the current operational firmware from the server device.

15. The system of claim 14, wherein the operational information comprises digital slide image data.

16. The system of claim 15, wherein the operational information comprises at least one contiguous digital image.

17. The system of claim 14, wherein the operational information comprises current configuration data for the respective digital slide scanning device.

18. The system of claim 14, wherein the server device is further configured to:

receive an instruction from the user device via the network, wherein the instruction identifies a first digital slide scanning device from the plurality of digital slide scanning devices; and send an instruction, corresponding to the instruction received from the user device, to the first digital slide scanning device.

19. The system of claim 14, wherein the server device is further configured to:

analyze the operational information stored in the non-transitory data storage apparatus; and schedule a maintenance appointment for at least one of the plurality of digital slide scanning devices based on the analysis.

20. The system of claim 14, wherein the network comprises a local area network and a wide area network.

21. The system of claim 20, wherein the network comprises the Internet.

22. The system of claim 14, wherein the operational information comprises synchronization information for a stage and line scan camera.

23. The system of claim 14, wherein the operational information comprises information for at least one line scan camera.

24. The system of claim 14, wherein the operational information comprises information related to an imaging sensor.

25. The system of claim 14, wherein the operational information comprises information related to a focusing sensor.

26. The system of claim 14, wherein the operational information comprises focus information.

* * * * *